Oct. 12, 1954  J. ALSINA COMELLAS  2,691,270
HYDRAULIC BRAKE

Filed July 1, 1953  3 Sheets-Sheet 1

Oct. 12, 1954  J. ALSINA COMELLAS  2,691,270
HYDRAULIC BRAKE
Filed July 1, 1953  3 Sheets-Sheet 2

Oct. 12, 1954     J. ALSINA COMELLAS     2,691,270
HYDRAULIC BRAKE
Filed July 1, 1953                          3 Sheets-Sheet 3
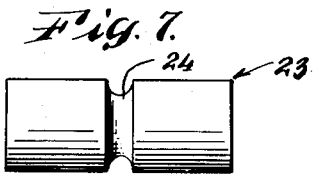
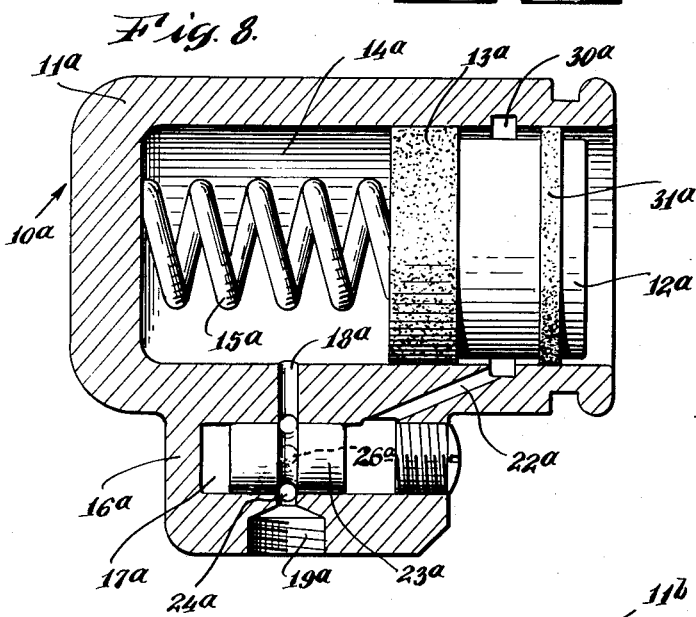
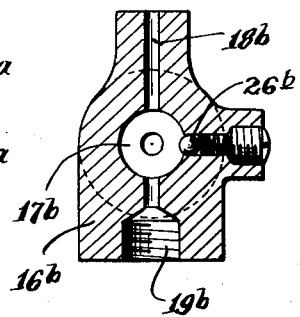
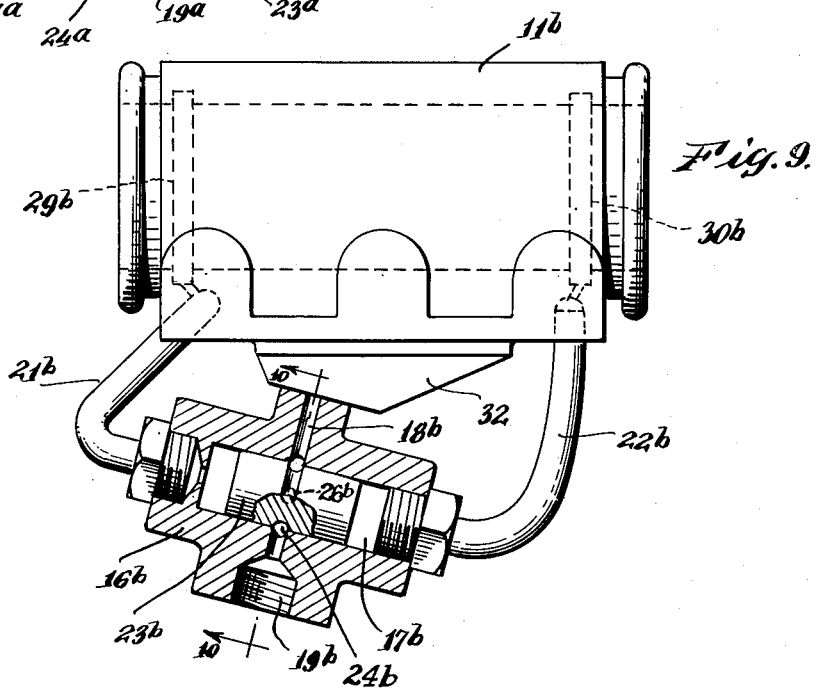

Patented Oct. 12, 1954

2,691,270

UNITED STATES PATENT OFFICE 2,691,270

HYDRAULIC BRAKE

Juan Alsina Comellas, Caracas, Venezuela

Application July 1, 1953, Serial No. 365,455

13 Claims. (Cl. 60—54.6)

The present invention relates generally to hydraulic brakes for automotive vehicles and is particularly directed to safety devices for preventing general failure of such brakes.

In hydraulic brake systems for automotive vehicles, the brake fluid is led from the master or actuating cylinder to the brake shoe operating cylinders associated with the brakes of the four wheels. Each of the brake shoe operating cylinders has at least one piston reciprocatable axially therein under the influence of the brake fluid and arranged to effect brake engaging movement of the related brake shoe. If the seal provided on any one of the brake shoe operating pistons becomes defective, the hydraulic or brake fluid leaks out of the system until an insufficient quantity of such fluid remains in the system, and the brakes associated with all four wheels then become inoperative.

Accordingly, it is an object of the present invention to provide safety means for isolating a defective brake shoe operating cylinder from the remainder of the hydraulic brake system so that the brake fluid will be contained in the system and the other brakes will continue to operate normally and ensure adequate braking of the vehicle.

Another object is to provide automatic safety means associated with each of the brake shoe operating cylinders of a hydraulic brake system and operative to interrupt the flow of brake fluid from the master cylinder to the related brake shoe operating cylinder in response to the leakage of brake fluid past the piston or pistons in the related brake shoe operating cylinder so that all of the brake fluid cannot drain from the system through the defective cylinder and the unimpaired brakes continue to operate in their normal fashion.

A further object is to provide safety means of the described character which may be embodied directly in the structure of new brake shoe operating cylinders, or may be constructed in the form of an attachment easily assembled on existing brake shoe operating cylinders without excessive alteration of the latter.

A still further object is to provide safety means of the described character which are simple in construction and operation to reliably perform the stated functions.

In accordance with the present invention, the above, and other objects, features and advantages, are achieved by providing a reciprocatable valve interposed in the line feeding brake fluid from the master cylinder to each of the brake shoe operating cylinders. The valve associated with each of the brake shoe operating cylinders is normally held in an axial position permitting the free flow of brake fluid to the related cylinder and is shifted axially from that normal position, to close the brake fluid feeding line, in response to the leakage of brake fluid past the piston or pistons in the related brake shoe operating cylinder. In order to cause such axial shifting of the reciprocatable valve in response to the leakage of brake fluid past the piston or pistons in the related cylinder, the latter is formed with internal, annular fluid collecting grooves in the zone of probable leakage, and leakage conducting lines extend from the collecting grooves to a chamber in which the valve reciprocates to apply the leaking brake fluid axially against the valve so that the leaking brake fluid actually shifts the valve to close-off the supply of fluid to the leaking cylinder.

In order that the present invention may be fully understood, illustrative embodiments thereof are hereinafter described in detail, merely by way of example, and shown in the accompanying drawings forming a part hereof, and wherein:

Fig. 7 is an elevational view of a valve element included in the embodiment of the invention shown in Figs. 1 to 6;

Fig. 8 is an axial sectional view, similar to Fig. 4, but showing another brake shoe operating assembly embodying the present invention;

Fig. 9 is a side elevational view of a conventional brake shoe operating cylinder having an attachment thereon embodying the present invention and shown in axial section; and Fig. 10 is a transverse sectional view of the attachment taken along the line 10—10 of Fig. 9.

Figure 1:
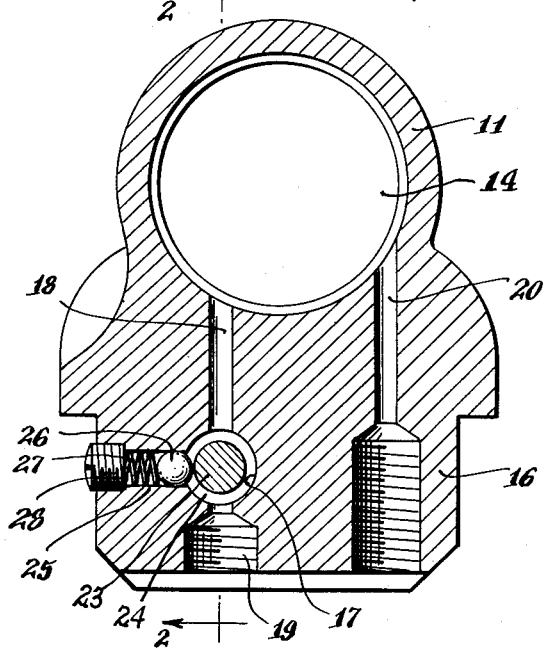
Fig. 1 is a transverse sectional view of a brake shoe operating cylinder with provision for safety means, part of which is shown, to be embodied therein in accordance with one form of the present invention.
Figure 3:
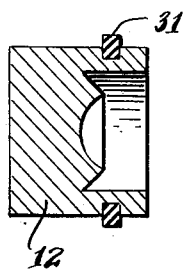
Fig. 3 is an axial sectional view of one of the pistons to be assembled within the cylinder of Figs. 1 and 2.
Figure 2:
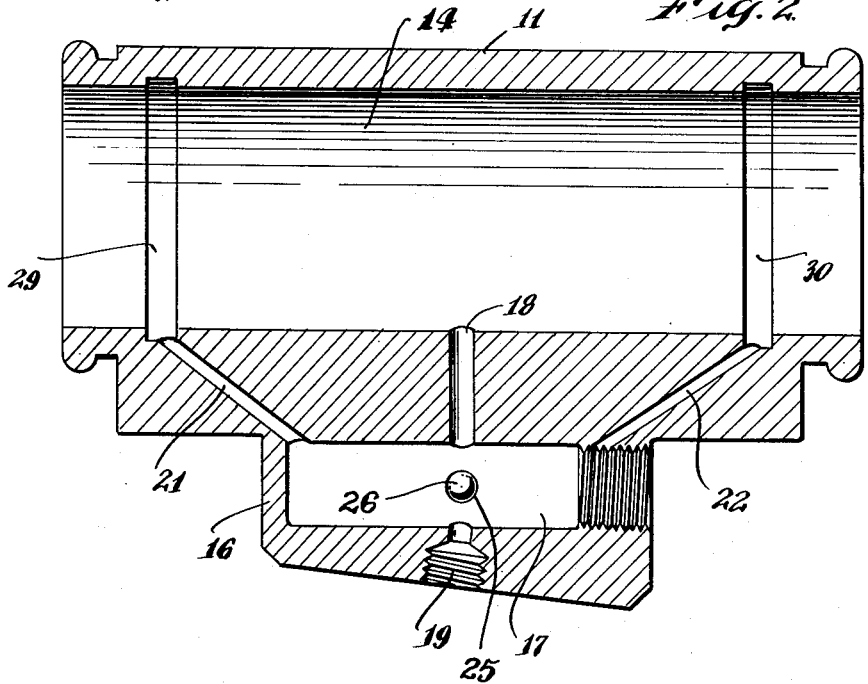
Fig. 2 is an axial sectional view taken along the line 2—2 of Fig. 1, but with a safety valve member included in Fig. 1 being omitted.
Figure 4:
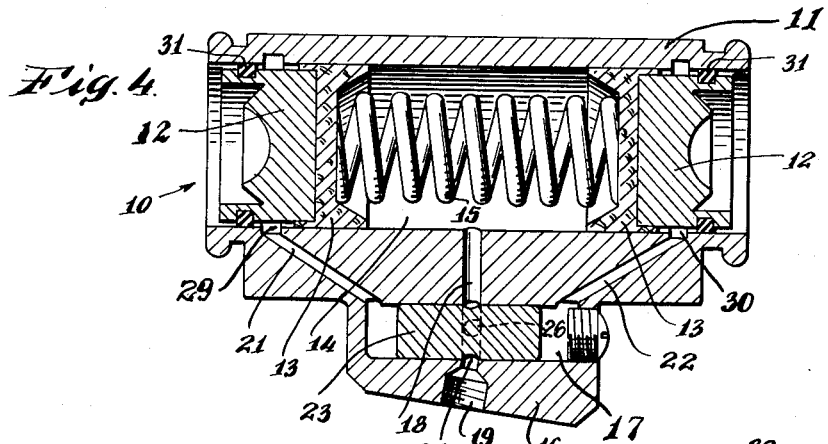
Fig. 4 is an axial sectional view of a brake shoe operating assembly including the parts of Figs. 1, 2 and 3 and having safety means embodying the present invention which are shown disposed to permit normal supplying of brake fluid to the brake shoe operating cylinder.

Referring to the drawings in detail, and initially to Fig. 4 thereof, a brake shoe operating assembly embodying the present invention is there illustrated and generally identified by the reference numeral 10. The assembly 10 includes a cylinder 11 which is open at its opposite ends and receives two axially slidable pistons 12. A cup shaped washer or sealing disc 13, which may be formed of leather or rubber, is disposed against the inside face of each of the pistons 12 to normally prevent leakage of brake fluid from the space 14, defined within the cylinder 11 between the two pistons 12, past the related pistons. A conventional spring 15 is disposed between the seals or packings 13 and acts to urge the seals and the related pistons axially apart and into engagement with the related ends of brake shoe members (not shown). The cylinder 11, at its underside, is formed with an integral body 16 (Figs. 1 and 2), and the body 16 is formed with an auxiliary bore 17 which is preferably parallel to the axis of the cylinder 11. A brake fluid inlet passage 18 extends upwardly from the central portion of the auxiliary bore 17 and opens into the interior of the cylinder 11. Brake fluid is supplied to the auxiliary bore 17 through a tapped inlet bore 19 which is substantially in alignment with the inlet passage 18 and is adapted to be connected to a suitable flexible conduit (not shown) extending to the master brake actuating cylinder of the brake system. A return passage 20 (Fig. 1) is also formed in the body 16 for returning the brake fluid from the space 14 between the pistons 12 to the master brake actuating cylinder, when the brakes are released.

A device of the kind illustrated in Fig. 4 is associated with each of the brakes on the automotive vehicle, so that at least four of such devices will be included in the braking system. Thus, if any one of the seals 13 is damaged, or otherwise becomes defective, the brake fluid leaking past the defective seal is lost from the system, and if the leak is not immediately observed and the cause thereof immediately remedied, there is the danger that so much of the brake fluid will be lost from the system as to render all of the brakes inoperative. However, in accordance with the present invention, each of the brake shoe operating assemblies 10 includes an arrangement for automatically preventing the further flow of brake fluid into the space 14 of the related cylinder 11 in response to the leakage of brake fluid past the seals 13. This safety arrangement includes passages 21 and 22 leading from the opposite end portions of the interior surface of the cylinder 11 to the related ends of the auxiliary cylinder or bore 17. A valve member, generally identified by the reference numeral 23 (Fig. 7), is reciprocatable axially within the auxiliary bore 17 and is formed with a circumferential groove 24 at approximately the center thereof. The valve member 23 is normally positioned, as shown in Fig. 4, so that hydraulic fluid entering the chamber or bore 17, through the inlet 19, can travel around the groove 24, which is then in alignment with the inlet bore 19, and into the inlet passage 18. When valve member 23 is shifted axially in either direction from its normal position, as shown in Figs. 5 and 6, the groove 24 is then no longer registered with the inlet port 19 and the inlet passage 18 so that the valve member 23 then prevents further flow of brake fluid into the space 14 of the cylinder.

In order to yieldably retain the valve member 23 in the normal position illustrated in Fig. 4, the body 16 is provided with a transverse tapped bore 25 (Fig. 1) which opens into the auxiliary bore 17, at the center of the latter, and accommodates a detent or ball 26 which is urged against the surface of the valve member 23 and into the groove 24 of the latter, by a spring 27 which is adjustably compressed by a suitable screw 28.

When brake fluid flows through either one of the passages 21 and 22 into the related end of the auxiliary bore 17, such brake fluid acts axially against the valve member 23 and overcomes the retaining force of the detent 26 to cause axial shifting of the valve member from its normal position. In order that the brake fluid leaking past one or the other of the seals 13 will be directed into the related passage 21 or 22, annular collecting grooves 29 and 30 are formed in the internal surface of the cylinder 11 adjacent the opposite ends of the latter, with the passages 21 and 22 being in communication, at their upper ends, with the annular grooves 29 and 30, respectively. Further, in order to ensure that the brake fluid leaking past one or the other of the seals 13 will be collected in the related groove 29 or 30, each of the pistons 12 is formed with an annular groove in its outer surface which accommodates a sealing ring 31 engaging the internal surface of the cylinder 11 at a location disposed axially outward relative to the related groove 29 or 30. Thus, the sealing rings 31 will cause the leaking brake fluid to back up into the groove 29 or 30 at the related end of the cylinder 11 and thence into the passage 21 or 22.

Figure 5:
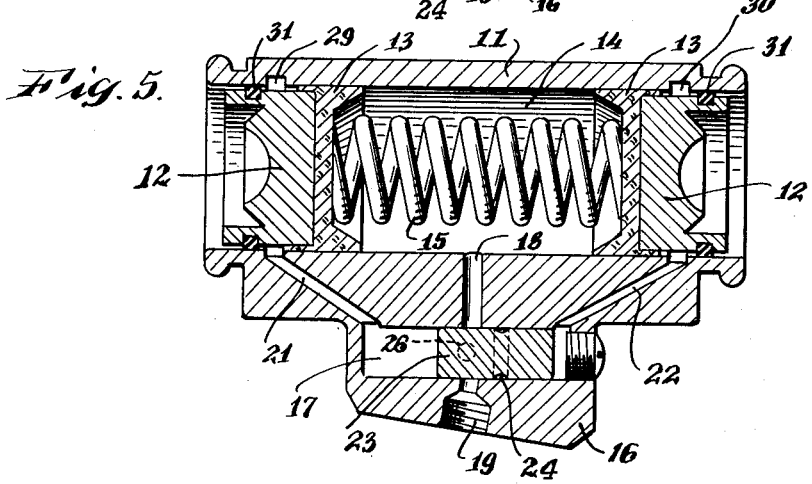
Fig. 5 is a view similar to Fig. 4, but showing the positions of the parts in response to leakage of brake fluid past one of the brake shoe operating pistons.
Figure 6:
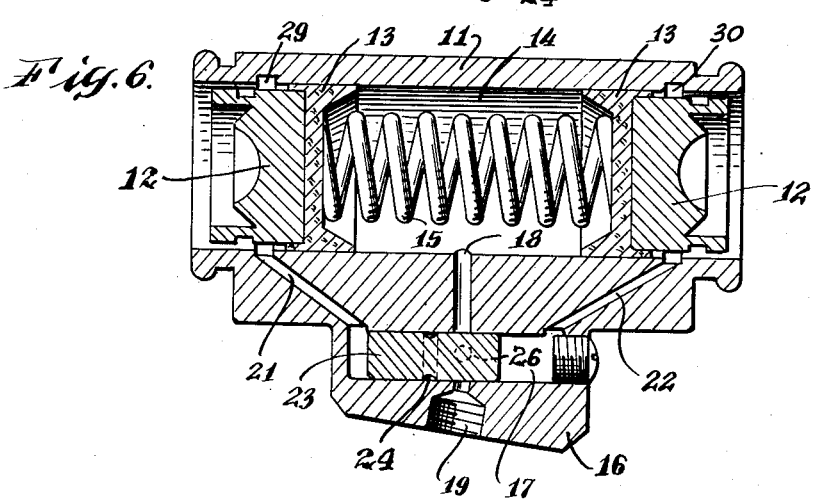
Fig. 6 is a view similar to Fig. 5, but showing the positions of the parts in response to the leakage of brake fluid past the other brake shoe operating piston.

When the seal 13 at the left hand end of the cylinder 11 (as viewed in the drawing) becomes defective to permit the leakage of brake fluid into the groove 29, such leaking brake fluid is communicated to the bore 17 through the passage 21 and acts axially against the valve member 23 to cause the latter to shift toward the right (as viewed in the drawing) to the position indicated in Fig. 5 thereby closing off the supply of brake fluid to the chamber or space 14. Thus, the leakage of brake fluid automatically acts to prevent further flow of brake fluid into the defective cylinder, and the remaining brakes in the brake system can continue to operate in the normal fashion to bring the vehicle to a safe halt. When the defective seal 13 is at the right hand end of the cylinder 11, as viewed in the drawings, the leaking brake fluid is collected in the groove 30 and passes through the passage 22 into the right hand end of the auxiliary bore 17 for axial action against the valve member 23. Thus, the leaking brake fluid causes shifting of the valve member towards the left, as viewed in the drawing, to again close off the communication between the inlet bore 19 and the inlet passage 18. It is therefore apparent that the above described embodiment of the invention operates with equal efficiency to prevent further flow of brake fluid into the space or chamber 14 whenever one or the other of the seals 13 at the opposite ends of the cylinder becomes defective.

However, the present invention is not limited in its application to double acting brake shoe operating assemblies, and, as shown in Fig. 8, may also be applied to a brake shoe operating assembly 10a of the kind which is effective to control or operate a single brake shoe. In Fig. 8, the parts corresponding to those described in connection with Figs. 1 to 7, inclusive, are identified by the same reference numerals with the letter "a" annexed thereto. The brake shoe operating assembly 10a includes a cylinder 11a which is open axially at only one end thereof and is formed with a body 16a on its underside. The body 16a is formed with an auxiliary bore 17a parallel to the axis of the cylinder 11a, and an inlet bore 19a opens into the auxiliary bore 17a. An inlet passage 18a extends from the auxiliary bore 17a into the chamber 14a defined within the cylinder 11a. A piston 12a is axially reciprocatable within the interior of the cylinder 11a, and a seal member 13a, which corrresponds to the seals 13 of the previously described embodiment is disposed in back of the piston 12a and is urged against the latter by a compression spring 15a within the chamber 14a. The internal surface of the cylinder 11a is formed with an annular groove 30a adjacent the open end of the cylinder, and a sealing ring 31a is carried by the piston 12a to sealingly engage the internal surface of the cylinder 11a at a location closer to the open end of the cylinder than the groove 30a. A passage 22a extends from the groove 30a to the auxiliary bore 17a, and opens into the latter at the related end thereof. A valve member 23a which is substantially similar to the valve member 23 of Fig. 7 is axially reciprocatable within the auxiliary bore 17a and has an annular groove 24a in its external surface for normal registration with the passage 18a and inlet bore 19a. The valve member 23a is maintained in its normal position by a ball detent 26a which may be the same as that illustrated in Fig. 1.

With the arrangement illustrated in Fig. 8, the valve member 23 normally permits brake fluid to enter the chamber 14a through the inlet bore 19a, the annular groove 24a and the inlet passage 18a. However, when brake fluid leaks past the seal member 13a, such leaking brake fluid is collected in the groove 30a and led from the latter to the auxiliary bore 17a through the passage 22a. The leaking brake fluid returned to the bore 17a acts against the valve member 23a to shift the latter to a position interrupting communication between the bore 19a and the passage 18a so that no further brake fluid can enter a cylinder having a leaking seal.

While the embodiment of the invention illustrated in Figs. 1 to 7 and in Fig. 8 both include the means for interrupting the flow of brake fluid to the brake shoe operating cylinder as an integral part of that cylinder, it is to be noted that the present invention is not limited to such an arrangement and may be applied as well to existing brake shoe operating cylinders. For example, as seen in Figs. 9 and 10 of the drawing, an existing and conventional cylinder 11b is reworked or altered to provide annular grooves 29b and 30b in the internal surface thereof adjacent the opposite open ends. A body 16b is interposed between the brake fluid inlet boss 32 on the conventional cylinder 11b and the brake fluid supplying line (not shown). The body 16b is formed with a bore 17b and conduits 21b and 22b extend from the grooves 29b and 30b, respectively, and communicate with the opposite ends of the bore 17b in the body 16b. A valve member 23b is axially reciprocatable within the bore 17b and is similar in configuration to the valve member 23 of Fig. 7. An inlet bore 19b is provided in the body 16b and opens into the bore 17b, while an inlet passage 18b extends from the bore 17b, at a location opposite the inlet bore 19b, and opens into the inlet boss 32 of the conventional cylinder 11b. The valve member 23b is normally maintained, for example, by a detent 26b of the kind illustrated in Fig. 1, in a position in which its annular groove 24b is engaged by the detent and registers with the bore 19b and the passage 18b. Thus, an attachment is provided for association with a conventional cylinder 11b so that when brake fluid leaks past one or the other of the piston seals (not shown) such leaking brake fluid is collected in one or the other of the grooves 29b and 30b to be led back to the bore 17b for shifting the valve member 23b from its normal position shown in Fig. 9.

From the foregoing, it is apparent that the present invention provides devices for preventing the loss of the entire supply of brake fluid when a leak develops in any one of the brake shoe operating cylinders of an automotive vehicle brake system. Further, it is apparent that the supply of brake fluid to the leaking or defective brake shoe operating cylinder is interrupted automatically in response to the leaking brake fluid, and that the brake fluid itself is employed in actuating the sealing valve member.

While specific embodiments of the present invention have been described in detail and illustrated, by way of example, it is to be understood that the invention is not limited to these precise embodiments, and that various changes and modifications may be effected therein without departing from the spirit or scope of the invention as defined in the appended claims.

What is claimed is:

1. In an hydraulic brake system; a brake shoe operating cylinder having at least one piston reciprocatable axially in an end portion thereof, means for conducting brake fluid to said cylinder, valve means interposed in said brake fluid conducting means, said valve means being movable between a normal position permitting the free flow of brake fluid through said conducting means and at least one other position blocking the flow of brake fluid through said conducting means, and means operative to collect brake fluid leaking past said piston and to apply the leaking brake fluid against said valve means to shift the latter from said normal position to said other position blocking flow through said brake fluid conducting means.

2. In an hydraulic brake system; the combination of a brake shoe operating cylinder open at least at one end thereof, a brake shoe operating piston reciprocatable axially in each open end portion of said cylinder, conduit means opening into said cylinder for conducting brake fluid to the latter, brake fluid actuated valve means interposed in said conduit means and movable between a normal position permitting flow through said conduit means and at least one other position blocking flow through said conduit means, sealing means on each of said pistons, means for collecting any brake fluid leaking past the sealing means associated with each piston, and means receiving the collected leaking brake fluid and applying the latter against said valve means to move said valve means from said normal position to said other position thereof for blocking the flow of brake fluid to said cylinder.

3. In an hydraulic brake system; the combination according to claim 2, further comprising yieldable means tending to maintain said valve means in said normal position permitting flow of brake fluid through said conduit means and into said cylinder.

4. In an hydraulic brake system; the combination according to claim 2, wherein said sealing means on each piston includes a sealing member on the back surface of the related piston and slidably engaging the internal surface of said cylinder, and wherein said brake fluid collecting means includes an annular groove formed in said internal surface of the cylinder adjacent each open end of the latter and a sealing ring extending circumferentially around each piston, said annular groove and sealing ring being disposed so that said groove is disposed axially between said sealing member and said sealing ring in all positions of the related piston to collect any brake fluid leaking past said sealing member.

5. In an hydraulic brake system; the combination according to claim 2, wherein said conduit means has a lateral bore extending thereacross, and said valve means includes a valve member reciprocatable axially in said lateral bore and having channel means formed therein and registering with said conduit means when said valve member is in said normal position, said valve member being formed to fill said bore and block said conduit means when it is shifted axially from said normal position.

6. In an hydraulic brake system; the combination according to claim 5, wherein said means receiving the collected leaking brake fluid includes a passage opening at one end at the interior of said cylinder adjacent each open end of the latter, said passage opening at its other end into an end portion of said bore receiving the valve member so that the collected leaking brake fluid is led into said bore to act axially against an end surface of said valve member.

7. In an hydraulic brake system; the combination according to claim 5, wherein said channel means in the valve member includes a circumferentially extending groove formed in the outer surface of the latter to carry brake fluid between the ends of said conduit means opening into said bore when said valve member is in its normal position.

8. In an hydraulic brake system; the combination according to claim 7, further comprising detent means yieldably projecting into said bore to engage in said circumferential groove of the valve member for yieldably maintaining the latter in said normal position thereof.

9. In an hydraulic brake system; the combination according to claim 5, wherein said sealing means on each piston includes a packing member on the back surface of each piston and slidably engaging the internal surface of said cylinder, and said brake fluid collecting means includes an annular groove in said internal surface of the cylinder adjacent each of the open ends of the latter and a sealing ring extending circumferentially around each piston, said annular groove and sealing ring being disposed so that said groove is disposed axially between said packing member and sealing ring in all positions of the related piston, and wherein said means receiving the collected leaking brake fluid includes a passage extending from each annular groove in said surface of the cylinder to a related end of said bore accommodating said valve member so that the collected leaking brake fluid is led into said bore to act axially against an end surface of said valve member.

10. In an hydraulic brake system; the combination according to claim 9, wherein said cylinder is open at its opposite ends and accommodates two axially reciprocatable pistons therein, and wherein said means receiving the collected leaking brake fluid includes passages extending from the grooves at the opposite ends of said cylinder to the corresponding opposite ends of said bore.

11. In an hydraulic brake system; the combination according to claim 9, wherein said bore accommodating the valve member is formed in a body integral with said cylinder.

12. In an hydraulic brake system; the combination according to claim 9; wherein said bore accommodating the valve member is defined in a body separably attached to said cylinder, and each passage receiving the collected leaking brake fluid includes a conduit section extending between said body and said cylinder.

13. In an hydraulic brake system; the combination according to claim 9; wherein said cylinder is open at only one end thereof and accommodates a single axially reciprocatable piston therein.

References Cited in the file of this patent

UNITED STATES PATENTS

| Number | Name | Date |
| --- | --- | --- |
| 1,588,657 | Christensen | June 15, 1926 |
| 1,712,316 | Trebert | May 7, 1929 |
| 2,398,910 | Pontius, 3d | Apr. 23, 1946 |
| 2,429,820 | Kean | Oct. 28, 1947 |